Nov. 8, 1966          H. C. ROTHE ETAL          3,283,409
                    GYROSCOPIC INDICATING DEVICE
Filed Sept. 12, 1962                        4 Sheets-Sheet 1

HEINRICH C. ROTHE,
FRITZ K. MUELLER,
WILHELM E. ROTHE,
ROBERT C. MARTIN, AND
ALVIN E. MOORE,
         *INVENTORS.*

BY  *Alvin E. Moore,*
         *ATTORNEY.*

HEINRICH C. ROTHE,
FRITZ K. MUELLER,
WILHELM E. ROTHE,
ROBERT C. MARTIN, AND
ALVIN E. MOORE,
INVENTORS.

Nov. 8, 1966 H. C. ROTHE ETAL 3,283,409
GYROSCOPIC INDICATING DEVICE
Filed Sept. 12, 1962 4 Sheets-Sheet 3

HEINRICH C. ROTHE,
FRITZ K. MUELLER,
WILHELM E. ROTHE,
ROBERT C. MARTIN, AND
ALVIN E. MOORE,
INVENTORS.

BY Alvin E. Moore
ATTORNEY.

Nov. 8, 1966

H. C. ROTHE ETAL 3,283,409

GYROSCOPIC INDICATING DEVICE

Filed Sept. 12, 1962

HEINRICH C. ROTHE,
FRITZ K. MUELLER,
WILHELM E. ROTHE,
ROBERT C. MARTIN, AND
ALVIN E. MOORE,
INVENTORS.

BY *Alvin E. Moore,*

ATTORNEY.

United States Patent Office 3,283,409
Patented Nov. 8, 1966

3,283,409
GYROSCOPIC INDICATING DEVICE
Heinrich Carl Rothe, Fritz Kurt Mueller, Wilhelm Ernst Rothe, and Robert Cherry Martin, Huntsville, Ala., and Alvin Edward Moore, Waveland, Miss., assignors to Astro-Space Laboratories, Inc., Huntsville, Ala.
Filed Sept. 12, 1962, Ser. No. 223,050
17 Claims. (Cl. 33—72)

This invention provides a measuring and indicating instrument that may be used to indicate the meridian of its location, the latitude of its location, or the bearing of an object relative to the points of the compass. It may be used ashore to ascertain direction or latitude or in determining or adjusting the lay of a missile, artillery piece, line-throwing gun, or architectural element. It also may be used in navigation on land, sea, or in the air to ascertain direction or latitude.

One of the problems in the design of a gyroscopic north-seeking instrument lies in the inherent tendency of the known type of gyrocompass to oscillate about its vertical axis as it continually moves to keep its spin axis pointed toward true north. This oscillation tends to generate friction in the bearings that support the oscillating casing of the gyroscope and in the electrical connecting means between this casing and relatively stationary outside elements, thus causing an accuracy-disturbing precession, and requiring a long period for obtaining a reading from the instrument. A need thus exists for a more accurate north-seeking device which will quickly measure and indicate the meridian of its location and the bearing of an object relative to it.

There is also a very important need for an efficient device which will quickly and accurately indicate the latitude of the instrument. For example, in the submarine art this necessity is urgent in dead reckoning aboard craft that remain submerged for long periods, at times under polar ice.

One form of combined compass and latitude indicator is disclosed in copending patent application Serial Number 172,949, filed on February 13, 1962, by Heinrich C. Rothe et al. In this device a ball-like gyroscopic rotor is freely mounted by means of a gas-bearing film, within a spherical cavity in a rotary element that is driven by a motor. The axis of the motor and rotary element is maintained in a vertical position, and thus turns with the earth about its center; but because of the viscosity of the gas-bearing film, the spin axis of the ball-like gyroscopic rotor lags in following the axis of the motor, thus making an angle. The angle of this lag is in the east-west plane; and the size of the angle is proportional to the latitude in which the instrument is located. The degree of accuracy of the device, especially in its indication of latitude, thus depends to a large extent on the size of this angle.

In view of these facts, one of the objects of this invention is to provide an accurate, quickly operating meridian indicator, comprising a gyroscopic rotor having an internal surface that is freely and universally mounted on a driving element, thus substantially reducing the friction in the gas-bearing film and increasing the size of the latitude-indicating angle.

Another object of the invention is to provide an accurate latitude indicator, comprising a gyroscopic rotor having an internal surface that is freely and universally mounted on a driving element.

A further object is to provide an accurate, quickly operated theodolite.

Another object is to provide, in a unitary device, a combined gyrocompass and latitude indicator, comprising a gyroscopic rotor with an internal, universal bearing of low friction.

A further object is to provide, in a unitary device, a combined gyrocompass, latitude indicator and theodolite.

The foregoing and other objects of the invention will become more fully apparent from the following detailed description of exemplary structure embodying the invention and from the accompanying drawings, in which.

Figure 1:
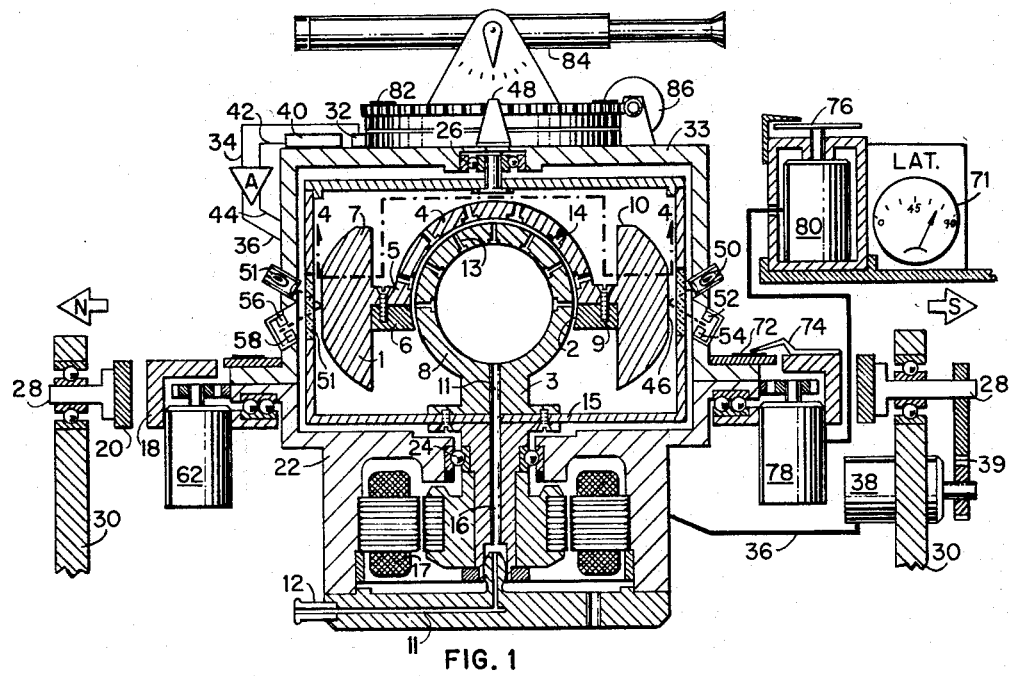
FIGURE 1 is an elevational view, in section along the north-south plane, of a preferred form of the invention.
Figure 2:
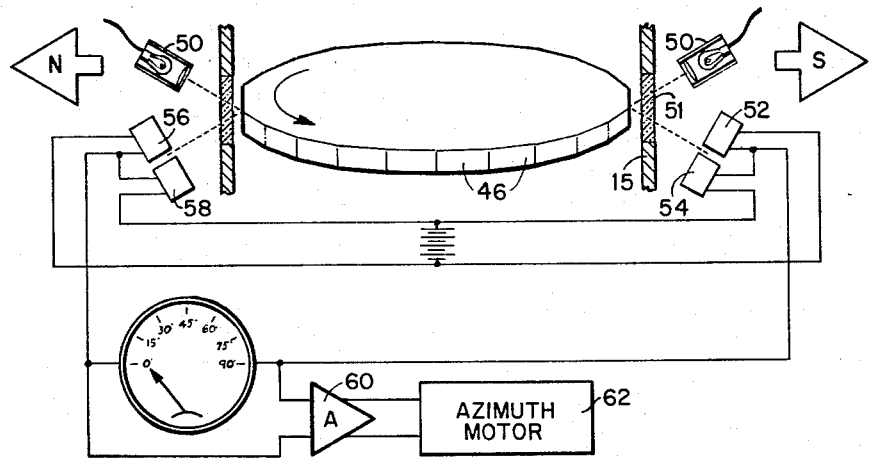
FIGURE 2 is a schematic view of the automatic, electrical controls which maintain the device in its north-seeking position.

The form of the invention shown in FIGURES 1 to 4 comprises a north-seeking device, a compass-course indicator, a latitude indicator and a theodolite. The key elements of this combined measuring and indicating device are: a gyroscopic rotor 1, having an internal spherical surface 2; a rotary driving element 3, having an external spherical surface on which the gyroscopic rotor is freely mounted by means of a gas-bearing film; and means for maintaining the axis of element 3 in a vertical position.

To lighten the load on the bearing film, the major part of the mass of rotor 1 is placed at a substantial distance from its center of rotation, thus providing a large angular momentum for a given weight of the rotor. In this form of the invention this distance is achieved by forming the rotor of relatively thin, radially-inner portions 4, 5, and 6 and a relatively thick, radially-outer ring 7. In assembly of the rotor, securing ring 6 is placed around the neck of element 3, the integral rotor part 4–5–7 is placed on the spherical surface 8 of element 3; and then ring 6 is moved into place against portion 5, and held there by means of screws 9. Since it extends below the horizontal median plane of the rotor, ring 9 prevents the rotor from becoming dislodged from its self-aligning position on spherical surface 8.

The rotor is dynamically balanced about its rotary axis by any known method—for example, by making small bores in it at proper locations; and preferably it is also statically balanced relative to its horizontal median plane. This static balance, which is especially important when the device is used on a ship or aircraft, may be achieved by making securing ring 6 thicker than portion 5, as shown in FIGURE 1, and machining off a small portion of the upper configuration of outer ring 7, as indicated at 10. This machining may be done by means of a lathe or grinder.

Compressed air or other gas, supplied to passages 11 from fitting 12, goes to the bearing via inlets 13 and from the bearing through outlets 14. The exhaust gas escapes from casing 15 and from the outer housing of the instrument via holes, or pipes, not visible in FIGURE 1, which preferably are located near the axis of rotation of the casing.

The gyroscope-rotating element 3 is rigidly connected with casing 15, in which the gyroscopic rotor is mounted, and with shaft 16. This shaft is driven by motor 17

(which as here shown is electrical); and its axis is maintained in a vertical position by automatic leveling means. This means comprises gimbal rings 18 and 20. On trunnions, whose axes are normal to the plane of the paper in FIGURE 1, ring 18 pivotally mounts outer housing or frame 22, in which shaft 16 and inner housing or casing 15 are rotatable on bearings 24 and 26. And on similar trunnions, shown at 28, gimbal ring 20 is pivotally mounted in supporting means 30. Thus housing 22 is universally mounted relative to elements 30, and, since the major mass of the housing and its contents is below the orthogonally arranged axes of the trunnions, the axis of driving elements 3 and 4 tends to remain in a vertical, plumb-line position. But when the instrument is on a moving vehicle its swinging as a pendulum preferably is reduced by automatic leveling mechanism which includes a dampening means. Preferably this mechanism is of the type disclosed in Patent No. 2,926,530, issued to Fritz K. Mueller and Robert C. Martin on March 1, 1960, and comprises two level-indicating units. When platform 33 moves out of its horizontal position on trunnions 28, level-indicating unit 32 supplies a signal current, via conductor 34, an amplifier, and conductor 36, to motor 38, which then drives gearing 39, to bring platform 33 back into the horizontal, thus returning the axis of rotary elements 3 and 16 to a vertical position. When, on the other hand, platform 33 moves out of its horizontal position on the pair of trunnions between rings 18 and 20, level-sensitive unit 40 supplies a signal current via conductors 42 and 44 to a motor, similar to 38, mounted on gimbal ring 20, which returns inner gimbal ring 18 and platform 33 to their horizontal positions.

Figure 3:
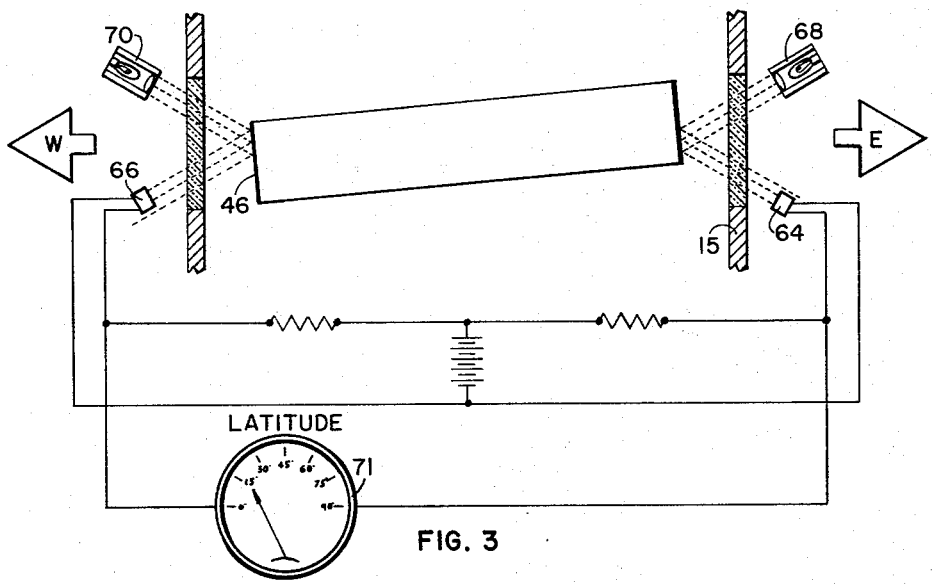
FIGURE 3 is a schematic view of the latitude-indicating photocell circuit.
Figure 4:
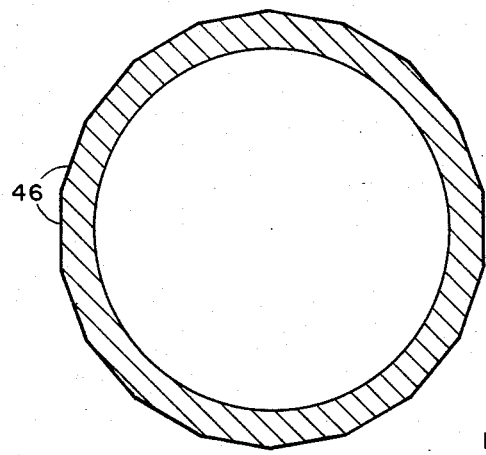
FIGURE 4 is a sectional view of the outer part of the rotor (in its static, unassembled condition), taken from the planes indicated by lines 4—4 of FIGURE 1.

With the axis of driving elements 3 and 16 thus maintained in a vertical position, and the instrument in any non-polar location, the spin axis of rotor 4–7 (and of its mirror-surfaced periphery, comprising rectangles 46) is tilted toward the west in the east-west plane, as schematically indicated in FIGURE 3. If housing 22 is properly positioned relative to this east-west plane, pointer 48 indicates the east-west direction. (Alternatively, this pointer may be positioned 90 degrees from its location in FIGURE 1, so that it points in the north-south direction.) In this proper alignment, indicated in FIGURES 1 and 2, the light beam that emanates from bulb 50 goes through glass or transparent plastic cylinder 51 (glued or otherwise fixed to the other two parts of casing 15), and falls on the space between photocells 52 and 54, so that no signal is sent to amplified 60 and azimuth motor 62. But when housing 22 is rotated out of its proper position by angular movement of supporting elements 30 relative to the north-south line, the mirror-surfaced rectangles 46 that are rotating past the light beam become tilted out of their previously vertical positions of intersection with the beams. For instance, if housing 22 rotates in a clockwise direction from its position in FIGURE 2 the beam from bulb 50 strikes each succeeding rectangle 46 while its upper edge is tilted toward the viewer of FIGURE 2, and thus is reflected downward on to photocell 54, which sends a signal to the amplifier. Although this single signal would cause azimuth motor 62 to turn housing 22 in a counterclockwise direction and thus restore it to its proper position, two pairs of photocells, as illustrated, are preferable; and so a signal of the deviation also is sent by photocell 56. Because of the plane surfaces of the rectangular, mirrored facets, these signals that are supplied to the bridge circuit are pulses of alternating current. If housing 22 rotates in azimuth in a counterclockwise direction signals are supplied from photocells 52 and 58, causing the motor to turn the housing in a corrective, clockwise direction.

The bridge circuit of the latitude-indicating part of the device is schematically shown in FIGURE 3. Housing 22 supports photocells 64 and 66 in substantially the east-west plane. If the instrument is located in a latitude smaller than 45 degrees (north or south), as indicated in FIGURE 3, the light beam from bulb 68 falls on the upper part of the photocell 64, with nearly all the beam on the cell, thus causing the photocell to supply a strong signal, nearly of maximum strength. At the same time nearly all the beam from bulb 70 falls on the lower part of photocell 66. These combined signals cause the voltmeter to indicate, on dial 71, a latitude that is near the equator. As the instrument is moved farther from the equator the tilt of the mirror-surfaced, polygonal rim in the east-west plane is decreased, with a corresponding reduction in the strength of the indicator-actuating signal, until at either of the poles the signal becomes zero and the latitude indication becomes ninety degrees.

Fixed to housing 22, there is an annular compass card 72, with its north-south line in alignment with pointer 74. Preferably, this pointer is aligned with or parallel to the longitudinal axis of the supporting vehicle or ship, and thus indicates the compass course of the craft. Optionally, a remotely located compass card, 76, may be rotated in synchronism with card 72 by means of synchro transmitter 78 and receiver 80.

A bearing indicator card is shown at 82. When theodolite element 84 is in the north-south direction, pointer 48 indicates zero on card 82. The card and its mounting may then be rotated by handwheel 86 and gearing until the telescope is aligned with an object in question, when the bearing of the object may be obtained from the card graduation indication by pointer 48.

Figure 5:
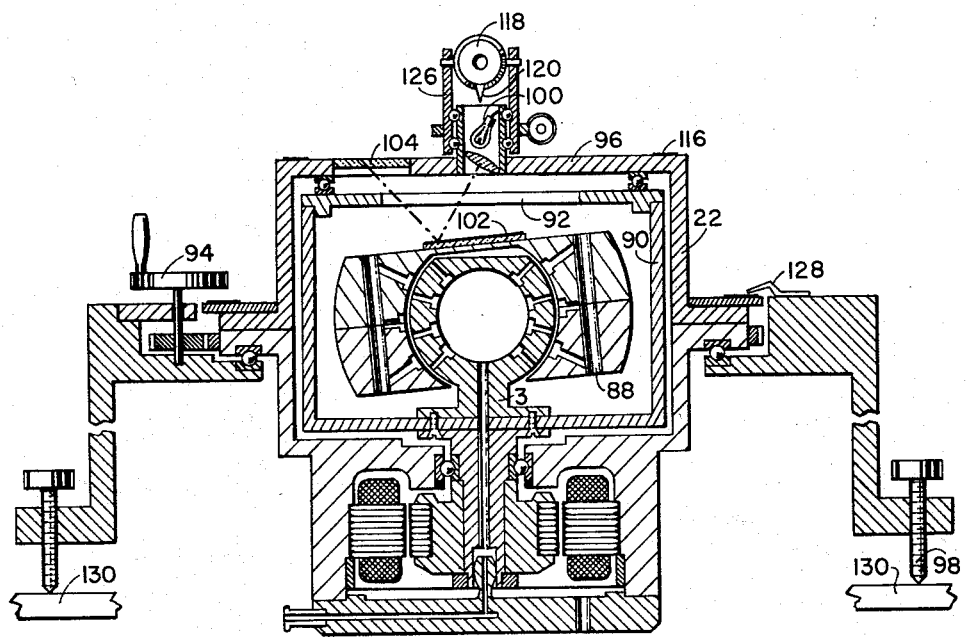
FIGURE 5 is an elevational view, in section along the east-west plane, of another form of the invention.
Figure 6:
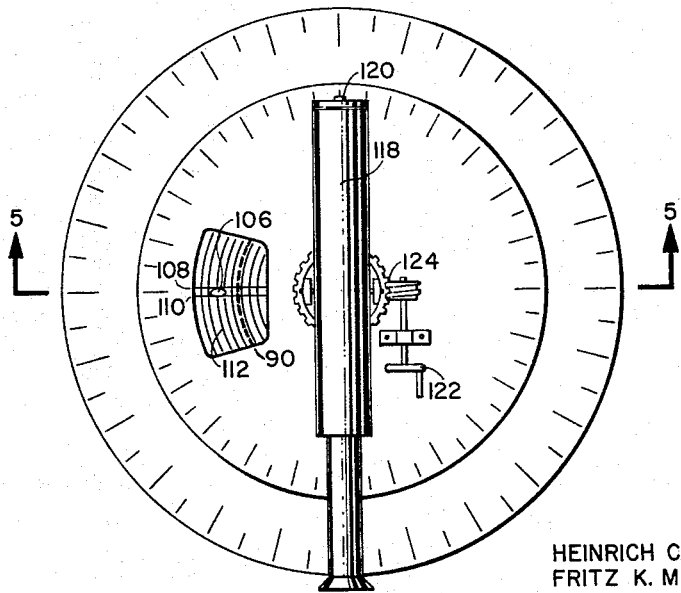
FIGURE 6 is a plan view of the instrument of FIGURE 5.

In a second and simpler form of the invention, shown in FIGURES 5 and 6, the gyroscopic rotor has a more compact shape, and has a plurality of evenly-spaced bores 88, through which the bearing-film gas is conducted, before it is exhausted from casing 90 via central aperture 92. In lieu of the electrical azimuth motor of FIGURE 1, manually operated motor means 94 is utilized; and four adjusting screws, 98, replace the automatic leveling means of FIGURE 1.

In this form of the device, the position-indicating pickup comprises a single light, 100, that projects a beam on mirror 102. This beam is reflected through opening 92 and on frosted glass window 104, forming on its upper surface a spot of light, 106. The window has two parallel lines 108 and 110, cut or otherwise formed on its surface, and as long as the casing 22 is properly oriented relative to the north-south line, the light spot 106 is centered within these lines. If the casing is not thus oriented, the hand wheel and gearing may be turned until the light spot is properly centered.

The window also has arcuate lines 112, having their radii of curvature centered on the axis of rotary element 3, which constitute latitude-indicating graduations. As the latitude of the instrument's location changes toward the equator, light spot 106 moves farther from the axis of element 3, and vice versa. For accurate latitude readings, the lines 108, 110, and 112 are fine and closely spaced, the spot of light 106 is small, and a magnifying glass or other optical instrument is used. Preferably, there is fixedly mounted on platform 96 an optical instrument of the general type indicated at 114 in FIGURE 7, with its lens focused on lines 108 and 110.

The device of FIGURES 5 and 6 further comprises a theodolite assembly which includes compass card 116, telescope 118, pointer 120, handwheel 122, and gearing 124. Obviously, pointer 120 may be placed on the bottom of the telescope pedestal and bearing support 126, but in FIGURE 2 it is shown at the forward end of the telescope.

Another pointer, 128, optionally may be utilized to indicate, when support 130 is maintained in a level position on a vehicle, the compass course of the craft.

Figure 7:
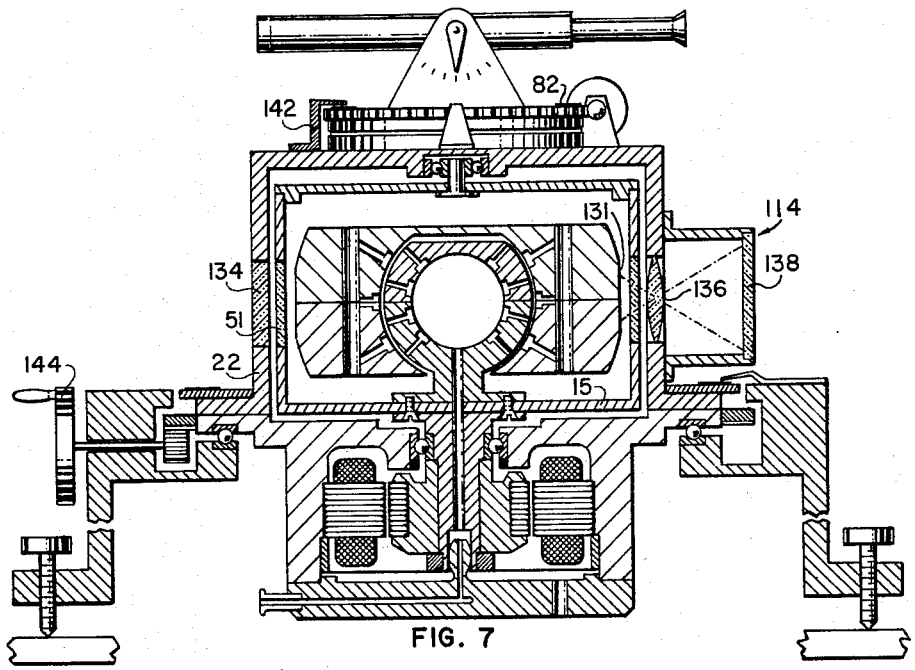
FIGURE 7 is a view in section along the north-south plane of a third form of the device.
Figure 9:
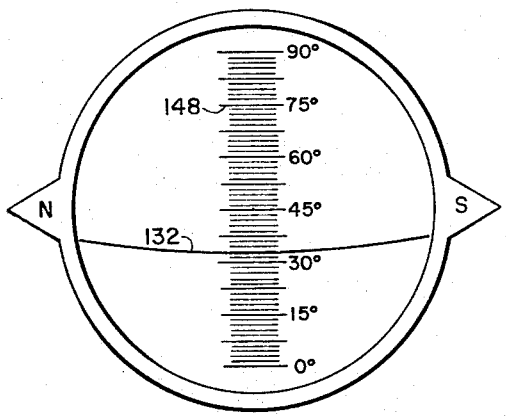
FIGURE 9 is an enlarged, schematic, elevational view of another form of latitude indicator.
Figure 8:
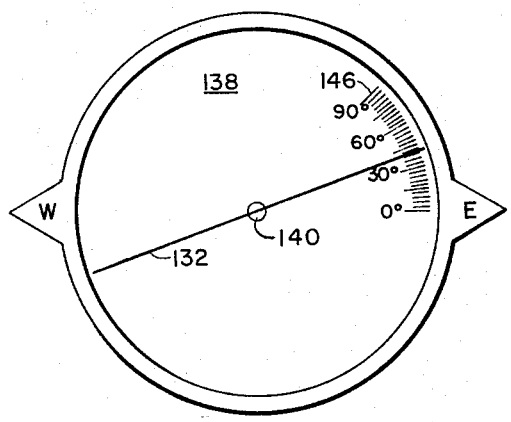
FIGURE 8 is an enlarged, schematic, elevational view of the latitude indicator of the device shown in FIGURE 7.

In the form of the device shown in FIGURES 7, 8, and 9, which also is hand-operated, a simple optical reading device which functions from the side of the instrument is utilized. In this modification, the gyroscopic rotor has a black, cylindrical rim 131; and on this rim, at the median plane of the rotor, there is a cylindrical silvered line, shown in FIGURE 8 at 132. Casing 15 has in its middle portion a continuous glass or transparent plastic band, 51. Instead of an electric light within element 114, there is a window 134, which admits outside light into the housing 22 and casing 15. Alternatively, line 132 may be formed of radium or phosphorus, instead of silver, and window 134 is eliminated.

Element 114 may be any known type of image-magnifying optical instrument or camera obscura. In its simple form here illustrated, it comprises lens 136 and frosted-glass screen 138. The type of image that appears on this screen, which is centered on the north-south line, is shown in FIGURE 8. As long as magnified line 132 bisects circle 140, which is formed on the frosted glass, housing 22 and pointer 142 are in their proper north-south orientation. When line 132 is above or below the center of circle 140, handwheel 144 is operated until the correct orientation is achieved. Then the graduation of scale 146 that is indicated by the upper end of line 132, in FIGURE 8, is a reading of the latitude.

In lieu of scale 146, a second optical device, similar to 114, but having a series of latitude-indicating parallel lines 148, indicated in FIGURE 9, may be placed on the east or west side of housing 22. The image shown in FIGURE 9 is on the screen of such an optical device that is mounted on the west side of the housing. Due to the westward inclination of the spin axis of the gyroscope, line 132 appears on the screen as having a downward curve. The graduation indicated by its center on the screen is the latitude reading.

The invention comprehends various changes in structure from that herein illustrated, within the scope of the subjoined claims.

The following invention is claimed:
1. An instrument comprising:
a support;
a frame, rotatably mounted on said support;
a glycroscope supported by said frame comprising: a rotary rotor-driving element having a vertical axis of rotation and an upper external, convex spherical surface; and a rotor, having a lower internal, concave, spherical surface having a curvature that is at least hemispherical in extent and that is concentric with said external surface, freely mounted, having a gaseous bearing on said element, and having a spin axis that, at any non-polar latitude of the earth's surface, has an inclination to the vertical, forming a lag angle that is free to change in size with changing latitude and is located in the vertical east-west plane, said rotor being driven thru said bearing by said rotary element;
means for maintaining said axis of rotation vertical;
position-sensing means, supported by said frame, for sensing and supplying a signal of any azimuthal rotation of said frame relative to said east-west plane;
means for rotating said frame until said signal is zero; and means, rotated by said last-named means, for indicating direction.

2. A measuring and indicating device comprising:
a support;
a housing;
means universally mounting said housing on said support;
a motor, fixed to said housing;
a ball-like rotary element connected to and rotatable by said motor, having an external spherical surface;
a gyroscopic rotor, freely supported by said rotary element, having an internal spherical surface mounted on and concentric with said external surface, said rotor having a spin axis that, at any non-polar latitude, has an inclination to the vertical in the east-west plane forming a latitude-indicating lag angle that is free to change in size with changing latitude;
means providing a gaseous bearing between said spherical surfaces, said rotor being driven thru said bearing by said rotary element;
means for maintaining in a predetermined position the axis of rotation of said rotary element;
position-sensing means, connected to said housing, for sensing rotation in azimuth of said housing out of its predetermined orientation to said east-west plane, and for sensing the size of said latitude-measuring angle;
indicator means, connected to said position-sensing means, for indicating said azimuthal rotation and the latitude of said location;
motive means, connected to said housing, for turning said housing back to its predetermined position in azimuth relative to the east-west plane; and
means to indicate the amount of said azimuthal rotation.

3. A device as set forth in claim 2, in which said means for maintaining the axis of rotation of the rotary element in a predetermined position comprises motors and gearing, connected with said housing.

4. A device as set forth in claim 2, in which said means for maintaining in a predetermined position the axis of rotation of said rotary element comprises level-sensing means, mounted on said housing and supplying signals of deviations of said element's axis from the vertical, and powered means, connected to said level-sensing means and influenced by said signals, for tilting said housing on its universal mounting and restoring said axis on its vertical position.

5. A device as set forth in claim 2, in which said position-sensing means comprises light-reflecting means on said gyroscopic rotor, means to provide light within said housing, and means for permitting exit from said housing of light reflected from said light-reflecting means.

6. A device as set forth in claim 5, in which said light-reflecting means comprises a mirror on said rotor, intersecting the spin axis of the rotor.

7. A measuring and indicating device comprising:
a support;
a housing;
means universally mounting said housing on said support;
a motor, fixed to said housing;
a rotary element connected to and rotatable by said motor, having an external spherical surface;
a gyroscopic rotor, freely supported by said rotary element, having an internal, spherical surface, mounted on and concentric with said external surface, said rotor having a spin axis that, at any non-polar latitude, has an inclination to the vertical in the east-west plane;
means providing a gaseous bearing between said spherical surfaces;
means for maintaining in a predetermined position the axis of rotation of said rotary element;
position-sensing means, connected to said housing, for sensing rotation in azimuth of said housing out of its predetermined orientation to said east-west plane, and for sensing the latitude-measuring angle that exists in any non-polar location, comprising light-providing means within said housing, light-reflecting means on said gyroscopic rotor, comprising an endless series of connected plane surfaces of light-reflecting material on a periphery of said rotor, and means for permitting exit from said housing of the reflected light;
indicator means, connected to said position-sensing means, for indicating said azimuthal rotation and the latitude of said location;
motive means, connected to said housing, for turning the housing back to its predetermined position in azimuth relative to the east-west plane; and
means to indicate the amount of said azimuthal rotation.

8. A measuring and indicating device comprising:
a support;
a housing;
means universally mounting said housing on said support;
a motor, fixed to said housing;
a rotary element connected to and rotatable by said motor, having an external spherical surface;
a gyroscopic rotor, freely supported by said rotary element, having an internal, spherical surface, mounted on and concentric with said external surface, said rotor having a spin axis that, at any non-polar latitude, has an inclination to the vertical in the east-west plane;
means providing a gaseous bearing between said spherical surfaces;
means for maintaining in a predetermined position the axis of rotation of said rotary element;
position-sensing means, connected to said housing, for sensing rotation in azimuth of said housing out of its predetermined orientation to said east-west plane, and for sensing the latitude-measuring angle that exists in any non-polar location, comprising light-providing means within said housing, light-reflecting means comprising a circular, peripheral line on said rotor, in a plane that is normal to the spin of the rotor, and means for permitting exit from said housing of the reflected light;
indicator means, connected to said position-sensing means, for indicating said azimuthal rotation and the latitude of said location;
motive means, connected to said housing, for turning the housing back to its predetermined position in azimuth relative to the east-west plane; and
means to indicate the amount of said azimuthal rotation.

9. A device as set forth in claim 8, in which said position-sensing means comprises a camera obscura, fixed to said housing, adapted to receive the reflected light emitted from within said housing.

10. A measuring and indicating device comprising:
a support;
a housing;
means universally mounting said housing on said support;
a motor, fixed to said housing;
a rotary element connected to and rotatable by said motor, having an external spherical surface;
a gyroscopic rotor, freely supported by said rotary element, having an internal, spherical surface, mounted on and concentric with said external surface, having a spin axis that, in any non-polar latitude, has an inclination to the vertical in the east-west plane;
means providing a gaseous bearing between said spherical surfaces;
means for maintaing in a predetermined position the axis of rotation of said rotary element;
position-sensing means, connected to said housing, for sensing rotation in azimuth of said housing out of its predetermined orientation to said east-west plane, and for sensing the latitude-measuring angle that exists in any non-polar location, comprising light-providing means within said housing, light-reflecting means on said rotor, and means for permitting exit from said housing of the reflected light;
indicator means, connected to said position-sensing means, comprising: two photocells, located on opposite sides of said rotor and intersecting the east-west plane; two pairs of photocells, located on opposite sides of the rotor and intersecting the north-south plane; an electrically operated latitude indicator, electrically connected with said first-named two photocells; and an electrically operated indicator, electrically connected with said two pairs of photocells, for indicating said azimuthal rotation; and
motive means, connected to said housing, for turning said housing back to its predetermined position in azimuth relative to the east-west plane.

11. A measuring and indicating device comprising:
a support;
a frame;
means universally mounting said frame on said support;
a motor fixed to said frame;
a rotary, rotor-driving element, connected to and rotated by said motor, having an external spherical surface;
a gyroscopic rotor, supported by said rotary element, having an internal spherical surface on and concentric with said external surface, and having a spin axis that, at any non-polar latitude, has an inclination in the east-west plane to the axis of said rotary element forming a latitude-indicating lag angle that is free to change in size with changing latitude;
means providing a gaseous-film universal bearing between said spherical surfaces;
means for maintaining vertical the axis of rotation of said rotary element;
a position-sensing assembly, connected with said housing, comprising means for sensing and indicating the size of said angle of said inclination; and
means connected with said position-sensing assembly, for indicating the latitude of the device's location.

12. A device as set forth in claim 11, in which said means for maintaining vertical the axis of rotation of said rotary element comprises level-sensing means, fixed to said housing, and supplying signals of deviations of said element's axis from the vertical, and powered means, connected to said level-sensing means and receiving said signals, for tilting said housing on its universal mounting and restoring said element's axis to its vertical position.

13. An indicating device comprising:
a support;
a housing;
means universally mounting said housing on said support;
a motor fixed to said housing;
a rotary element, connected to and rotatable by said motor, and having an external, curved surface;
a gyroscopic rotor, supported by said rotary element, having an internal spherical surface that is located on and is concentric with said external surface, and having a spin axis that, at any latitude, has an inclination in the east-west plane to the axis of said rotary element forming a latitude-indicating lag angle that is free to change in size with changing latitude;
means providing a gasous-film universal bearing between said spheric surfaces, said rotor being driven through said bearing by said rotary element;
means providing for a vertical position of the axis of said rotary element;

14. An indicating device comprising:
a support;
a housing;
means universally mounting said housing on said support;
a rotor fixed to said housing;
a rotary element, connected to and rotatably by said motor, and having an external, curved surface;
a gyroscopic roto, supported by said rotary element, having an internal spherical surface that is located on and is concentric with said external surface, and having a spin axis that, in any non-polar latitude, has an inclination in the east-west plane to the axis of said rotary element;
means providing a low-friction universal bearing between said spherical surfaces;
means providing a vertical position of the axis of said rotary element; and position-sensing means, connected to said housing, for sensing azimuthal rotation of said housing relative to the east-west plane, comprising, on said rotor, a peripheral band of connected, light-reflecting plane surfaces, each of which has the shape of a parallelogram.

15. A device as set forth in claim 14, in which said position-sensing means further comprises means to provide light within said housing, and means permitting exit from said housing of light reflected from said light-reflecting surfaces.

16. An instrument comprising:
a support;
a frame, rotatably mounted on said support, and having a north-south datum line;
a gyroscope, supported by said frame, comprising: a rotary element, having a vertical axis of rotation and an external, convex, spherical surface; a rotor having an internal, concave, spherical surface; and means providing a gaseous-film bearing between said spherical surfaces; said rotor having a spin axis that is inclined to the vertical in the east-west plane forming a latitude-indicating lag angle that is free to change in size with changing latitude;
position-sensing means, connected to said frame, for sensing and supplying a signal of any azimuthal rotation of said frame relative to said east-west plane;
means for rotating said frame until said signal is zero, when said north-south datum line is properly oriented; and
a theodolite, supported by said frame, comprising: a sighting device; means for rotating said sighting device for obtaining a line of sight on an object; and means for indicating the bearing of said line of sight, comprising two parts, one of said parts being attached to said frame, and the other being connected to and rotatable with said sighting device.

17. A gyroscopic instrument comprising: a housing; a driving element, rotating on an axis that is fixed relative to said housing; a gyroscopic rotor, having a bearing on said driving element that permits tilting motion between said rotor and housing; and means to indicate said tilting motion, comprising means to provide light within said housing, a peripheral rim on said rotor providing an endless series of connected plane surfaces comprising material for reflecting said light; and means permitting exit from said housing of light reflected from said material.

References Cited by the Examiner

UNITED STATES PATENTS

| 1,890,831 | 12/1932 | Smyth | 33—226 |
| 1,998,948 | 4/1935 | Wittkuhns | 33—226 |
| 2,044,899 | 6/1936 | Carter | 33—226 |
| 2,577,313 | 12/1951 | Downing | 33—204 |
| 2,790,119 | 4/1957 | Konet et al. | 33—206 |

FOREIGN PATENTS

| 1,251,996 | 12/1960 | France. |
| 784,693 | 10/1957 | Great Britain. |

ROBERT B. HULL, *Primary Examiner.*

ISAAC LISANN, *Examiner.*